United States Patent
Tripathi et al.

(10) Patent No.: US 8,644,782 B2
(45) Date of Patent: Feb. 4, 2014

(54) AGILE CLOCKING WITH RECEIVER PLL MANAGEMENT

(75) Inventors: Brijesh Tripathi, San Jose, CA (US); Timothy J. Millet, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/435,033

(22) Filed: Mar. 30, 2012

(65) Prior Publication Data

US 2013/0120037 A1  May 16, 2013

Related U.S. Application Data

(60) Provisional application No. 61/559,339, filed on Nov. 14, 2011.

(51) Int. Cl.
*H04B 7/00* (2006.01)

(52) U.S. Cl.
USPC .......................................... 455/259; 375/354

(58) Field of Classification Search
USPC ............... 455/63.1, 67.11, 180.1, 180.3, 255, 455/256, 259, 260, 296, 310; 375/375, 376, 375/354, 355; 713/500
See application file for complete search history.

(56) References Cited

U.S. PATENT DOCUMENTS

| 4,941,174 A | 7/1990 | Ingham |
| 5,392,435 A | 2/1995 | Masui et al. |
| 6,567,654 B1 * | 5/2003 | Coronel Arredondo et al. ............................. 455/315 |
| 6,738,429 B1 | 5/2004 | Bourdeau |
| 6,999,723 B2 * | 2/2006 | Kusbel et al. ................ 455/63.1 |
| 7,443,250 B2 | 10/2008 | Seethamraju et al. |
| 7,634,028 B2 | 12/2009 | Crawley |
| 7,800,451 B2 | 9/2010 | Fu et al. |
| 7,948,407 B2 | 5/2011 | Yonezawa et al. |
| 8,228,431 B2 * | 7/2012 | Gao et al. .................... 455/180.3 |
| 2005/0265486 A1 | 12/2005 | Crawley |
| 2007/0025489 A1 | 2/2007 | Milton et al. |
| 2011/0022875 A1 * | 1/2011 | Behzad et al. ................ 713/500 |
| 2011/0140791 A1 | 6/2011 | Van De Beek et al. |

OTHER PUBLICATIONS

International Search Report and Written Opinion in application No. PCT/US 12/56857 mailed Dec. 7, 2012.

* cited by examiner

*Primary Examiner* — Thanh Le
(74) *Attorney, Agent, or Firm* — Lawrence J. Merkel; Meyertons, Hood, Kivlin, Kowert & Goetzel, P.C.

(57) ABSTRACT

A method and apparatus for changing a frequency of a clock signal to avoid interference is disclosed. In one embodiment, data conveyed on a first interface is synchronized to a clock signal at a first frequency. Signals are conveyed on a second interface at another frequency. Responsive to a change of the frequency at which signals are conveyed on a second interface, a clock control unit associated with the first interface initiates a change of the clock signal to a second frequency. The second frequency may be chosen as to not cause interference with the frequency at which signals are conveyed on the second interface. The change of the clock frequency may be performed in such a manner as to prevent spurious activity on the clock line of the interface.

25 Claims, 5 Drawing Sheets

AGILE CLOCKING WITH RECEIVER PLL MANAGEMENT

PRIORITY CLAIM

This application claims priority to U.S. Provisional Application 61/559,339, filed on Nov. 14, 2011.

TECHNICAL FIELD

The present disclosure relates to the field of electronic devices, and more particularly to the dynamic changing of clock signal frequencies.

BACKGROUND DESCRIPTION

In modern electronic devices and systems, many signals are conveyed between various functional units, as well as to external devices/systems. The various signals may include data signals, clock signals, radio signals, and so forth. The frequencies of such signals may vary with respect to one another.

Often times during the operation of such a device, the frequencies of various signals may be deliberately changed during operation. For example, the frequency of a given clock signal may be reduced in order to minimize power consumption, or may alternatively be increased to boost performance. In another example, many wireless communications devices may use a technique known as frequency hopping spread spectrum (FHSS), in which the frequency of a radio carrier signal is periodically changed. Periodically changing the frequency of a radio carrier signal may randomize, and therefore reduce interference from outside sources.

Since the electronic system and devices referred to above are arranged for signal transmissions and receptions at a number of different (and varying) frequencies, circuitry may be implemented to manage the frequencies of at least some of these signals.

SUMMARY

Various method and apparatus embodiments for dynamically changing a frequency of a clock signal are disclosed. The frequency of the clock signal may be changed in order to reduce or prevent interference with frequencies of other signals conveyed in an electronic system. The frequency to which the clock signal may be chosen such that its base frequency and harmonics thereof are not coincident with a frequency of other signals conveyed in the system, thereby reducing or eliminating the chance that the clock signal will interfere with the other signals.

An electronic system having first and second interfaces is contemplated. Information transmitted on the first interface may be synchronized to a corresponding clock signal. On the second interface, frequencies of signals conveyed thereupon may include signals having a certain frequency. The frequency of the signals conveyed on the second interface may be periodically and deliberately changed. Responsive to changing the frequencies of signals conveyed on the second interface, the frequency of the clock signal for the first interface may be changed to another frequency that may avoid interference with signals on the second interface.

In one embodiment, an electronic system includes at least one serial interface and a wireless communications interface. Data transmitted on the serial interface may be synchronized to a clock signal having a first frequency. Information may be conveyed on the second interface in accordance with a carrier signal. The frequency of the carrier signal may be periodically changed (e.g., in accordance with a pseudorandom sequence used in spread spectrum communications). In one embodiment, the frequency of the clock signal may be changed from the first frequency to the second frequency responsive to the change of frequency of the carrier signal (pending or completed). In another embodiment, a list of safe and non-safe clock frequencies may be generated based on information of pending frequency changes in the wireless communications interface. The second frequency may be chosen such that neither it nor its associated harmonics are coincident with the new frequency of the carrier signal.

Changing the frequency of the clock signal may be performed in a manner intended to avoid spurious activity on the signal upon which the clock signal is conveyed. In one embodiment, a clock signal output by clock generation circuitry (e.g., a phase locked loop, or PLL) may be inhibited during the change of frequencies. In another embodiment, a PLL may be shut down during the change of frequencies. In some embodiments, an alternate clock signal may be substituted for the normal clock signal during the change. Such embodiments may utilize a glitch-free multiplexer to select the normal clock signal (during normal operations) or the alternate clock signal (during frequency changes of the normal clock signal). A change of the frequency of the clock signal may be initiated by a clock control unit. The clock control unit may initiate such change responsive receiving information from another unit (e.g., a baseband unit in a wireless communications device) indicating that the frequency of the carrier signal is to be changed or responsive to a change of a list indicating which clock signal frequencies are "non-safe" frequencies in terms of potential interference.

BRIEF DESCRIPTION OF THE DRAWINGS

Other aspects of the disclosure will become apparent upon reading the following detailed description and upon reference to the accompanying drawings which are briefly described as follows.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION

Figure 1:
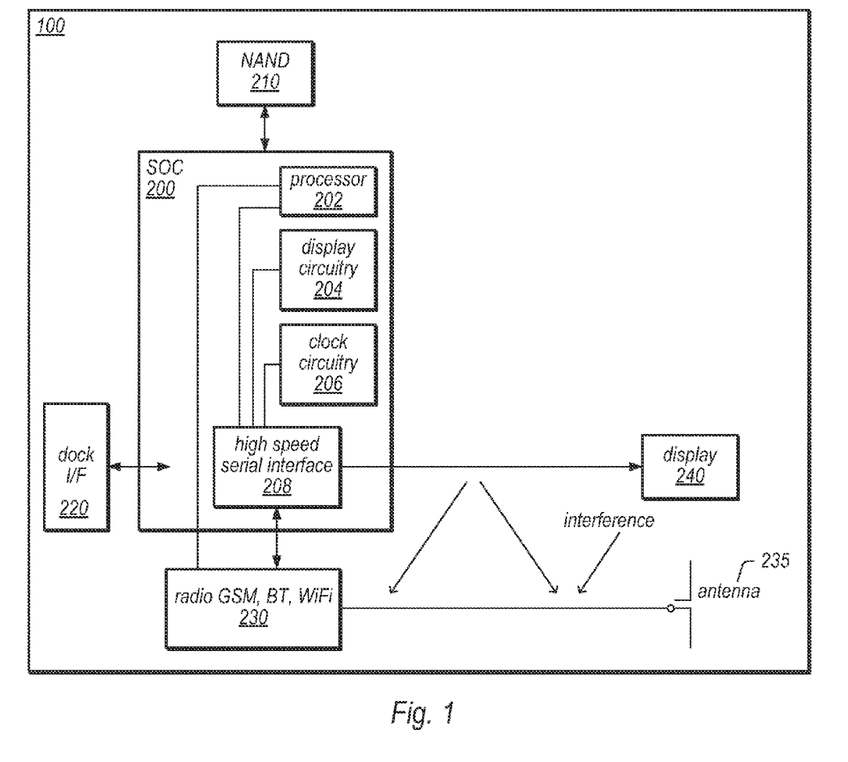
FIG. 1 a block diagram of a system including a serial interface and a wireless communications interface.

FIG. 1 illustrates an exemplary device 100, which may implement embodiments described herein. The device 100 may be any of various devices. For example, the device 100 may be a portable or mobile device, such as a mobile phone, PDA, audio/video player, etc. In embodiments described herein, the device 100 may be configured to communicate with other devices (e.g., other wireless devices, wireless peripherals, cell towers, access points, etc.) using one or more wireless channels. As used herein, a "wireless device" refers to a device that is able to communicate with other devices or systems using wireless communication. For example, the device 100 may be configured to utilize one or more wireless protocols, e.g., 802.11x, Bluetooth, WiMax, CDMA, GSM, etc., in order to communicate with the other devices wirelessly. The device 100 may also be configured to adjust and/or change input clocking signals within the device 100 in order to reduce (or eliminate) interference with communication using the wireless channels.

As also shown in FIG. 1, the device 100 may include a display 240, which may be operable to display graphics provided by an application executing on the device 100. The application may be any of various applications, such as, for example, games, internet browsing applications, email applications, phone applications, productivity applications, etc. The application may be stored in a memory medium of the device 100. The device 100 may include a central processing unit (CPU) and a graphics processing unit (GPU) which may collectively execute these applications.

As shown in FIG. 1, the device 100 may include a system on chip (SOC) 200, which may include portions for various purposes, including processor 202, display circuitry 204, and clock circuitry 206, which may all be coupled to serial interface 208 (e.g., a high speed serial interface (HSSI), such as a mobile industry processor interface (MIPI)). The HSSI 208 may provide information to the display 240, including an HSSI clock signal. For example, the display 240 may display graphics according to the HSSI clock signal. Other embodiments may use other interfaces, such as the display port interface, instead of the MIPI interface.

In addition to the SOC 200, the device 100 may include various types of memory, e.g., including NAND 210, a dock interface 220, the display 240, and wireless communication circuitry 230 (e.g., for GSM, Bluetooth, WiFi, etc.) which may use antenna 235 to perform the wireless communication. As shown, there may be interference between the signals provided from the HSSI 208 to the display 240 and the wireless communications using the antenna. For example, the HSSI clocking signals (e.g., harmonics of the HSSI clocking signals) may interfere with one or more wireless communication channels used by the radio 230. Accordingly, as described below, this interference may be mitigated or reduced by adjusting the HSSI clocking signals.

In one embodiment, communication circuitry 230 may operate in accordance with the principles of frequency hopping spread spectrum (FHSS). In an FHSS system, the frequency of an RF (radio frequency) carrier signal is periodically changed in order to randomize interference from other sources. The change of frequency may be occur in accordance with a pseudorandom sequence known by both the transmitter and receiver. Although the frequency of the RF carrier may be periodically changed to randomize interference, the close proximity to HSSI 208 (and thus its clocking circuitry) may nevertheless result in some interference to the base frequency of the clock signal as well as harmonics thereof. However, the various embodiments discussed herein contemplate dynamically changing the clock frequency of HSSI 208 responsive to receiving information regarding changes to the frequency of the RF carrier conveyed between communications circuitry 230 and antenna 235. The changing of the clock frequency of HSSI 208 to coincide with changes to the frequency of the RF carrier signal of communications circuitry 230 may reduce or prevent interference from the clock signal and its associated harmonics.

It is noted that, while various embodiments may include components on the SOC 200, other embodiments may implement the components as two or more integrated circuits. In general, the components of the SOC 200 may be viewed as a host for the display 200 (e.g. as shown in FIG. 2 below).

Furthermore, while the methodology is described herein relative to specific apparatus embodiments, these embodiments are not intended to be limiting. In contrast, the methodology described herein may be applied to any apparatus having multiple interfaces, wherein signals conveyed on one interface could potentially interfere with signals on another interface and possibly cause performance degradation.

Figure 2:
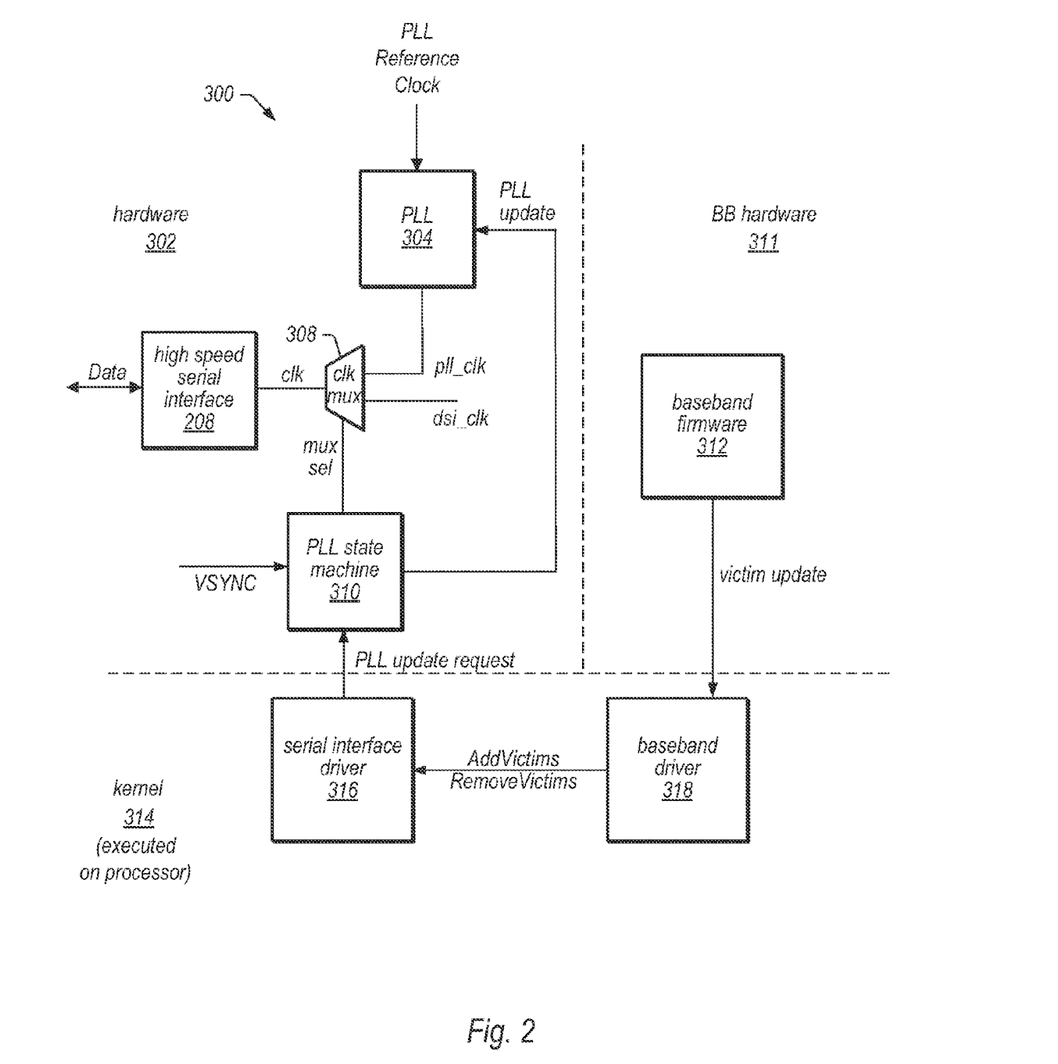
FIG. 2 is an exemplary block diagram of the system of FIG. 2, including hardware and software components, according to one embodiment.

FIG. 2 illustrates various hardware and software logic that may be used to reduce or remove wireless interference in the device 100. The reduction or removal of interference with signals conveyed on a wireless interface may be accomplished in this particular embodiment by changing a frequency of a clock signal conveyed on another interface. The clock signal frequency may be changed such that its base frequency and various harmonics thereof are not substantially coincident with the frequency of signals (e.g., an RF carrier signal) on the wireless interface.

As shown, hardware 302 may include the high speed serial interface circuit 208 which may receive clock signals from a clock generation circuit, PLL 304 (also referred to herein as "first clock", "adjustable clock", or 'pll_clk'), or dsi_clock (also referred to herein as "second clock" or "static clock") via multiplexer 308 (hereinafter 'mux 308'), which may be a glitchless mux. PLL 304 in the embodiment shown may be any type of PLL, and may generate an output signal the pll_clk signal based on a PLL reference clock signal received from an external source (e.g., an oscillator). PLL 304 may include components such as a phase detector, a low pass filter, a voltage controlled oscillator (VCO) and a divider ('DIV' in the drawing) implemented in a feedback path. The frequency of the pll_clk signal may be dependent at least in part on a current divisor value of the divider, which may be controlled by PLL state machine 310 in this embodiment.

As shown, the output clock of the mux 308 may be selected according to a selection by the PLL state machine 310, which may also modify the PLL 304 frequency, as desired. The PLL state machine 310 may receive vertical sync (VSYNC) notifications and PLL update requests as inputs. The PLL state machine 310, the PLL 304, and the clock mux 308 may be included in the clock circuitry 206 shown in FIG. 1.

The kernel 314 (which may be executed on processor 202) may include a serial interface driver 316 which may provide the PLL update requests to the PLL state machine 310. Further, the kernel may include a baseband driver 318 which may communicate with both the serial interface driver 316 (providing or removing wireless communication interference frequencies, also referred to as "victims" or "victim frequencies") and baseband firmware 312 (in baseband hardware 311). In one embodiment, the victim frequencies may correspond to the frequencies of RF carrier signals that will be conveyed on the wireless interface in an embodiment that utilizes FHSS. The baseband firmware 312 may determine which frequencies are to used during operation using FHSS. The frequencies may be determined based on a pseudorandom pattern used by a transmitter and receiver (wherein baseband hardware 311 may include either or both). The use of the pseudorandom pattern may be synchronized between the transmitter and receiver such that both are utilizing the same RF carrier signal frequency at the same time. Based on the determined frequency changes to the RF carrier signal, baseband firmware 312 may provide updates of the list of victim frequencies to the baseband driver 318. Note that the victim frequencies may not just cover the strict wireless channels (e.g., RF channels) being used, but may also include sufficient margin to protect against harmonics of the serial interface clock.

At boot or resume from suspend to RAM, the clock mux 308 may select the dsi_clk. This clock sets the nominal frequency for the serial interface 208 and the PLL 304 clock frequencies may be near it. Exemplary frequencies are 256.5 MHz, 342 MHz, and 513 MHz. At this time, the list of victim frequencies maintained by the serial interface driver 316 may be empty and the list of victim frequencies maintained by the communication center 324 may be cleared in order to be up to date. The PLL 304 may lock to the dsi_clk or a designated frequency near the dsi_clk, and then the clock mux 308 may select the PLL output as the clock for the serial interface 208.

As operation continues, the baseband firmware 312, having determined that the wireless communication radios will be depending on different victim frequencies in the near future, may send an updated list of victim frequencies to communication center 324 via baseband driver 318. The communication center 324 may modify the victim update from the baseband firmware 312 or pass it along as is to the baseband driver 318.

Accordingly, the baseband driver may either add or remove victim frequencies to/from the serial interface driver 316. The serial interface driver 316 may accordingly update its list of active victim frequencies and then search a list of possible PLL frequencies to find a safe choice (e.g., a choice that removes or reduces wireless communication interference of the victim frequencies).

If the safe choice of the PLL frequency has changed, the serial interface driver 316 may send a PLL update request to the PLL state machine 310. When a PLL update request is pending in this particular embodiment, the PLL state machine may wait for the next VSYNC from the display subsystem. After the VSYNC signal is received, the PLL state machine 310 may enter an intermediate state by switching the clock mux 308 to the dsi_clk. While in the intermediate state, PLL state machine 310 may and update the PLL settings (e.g., the divisor) to begin the locking process. After the PLL 304 has locked at the new frequency, the clock mux 308 may be changed back to the PLL 304, thereby exiting the intermediate state and resuming normal operation with the clock signal provided from PLL 304 (at the new frequency) to HSSI 208. While the actual lock time depends on PLL design, it may occur in less then 100 μs in various embodiments.

In some cases, PLL 304 may be effectively shut down for at least part of the changeover to the next safe PLL frequency. In one embodiment, this may be accomplished by gating the PLL reference clock. Completely powering down PLL 304 during at least a portion of the changeover may also be possible in some embodiments. In such embodiments, PLL 304 may remain powered down for a predetermined time before being powered up again to lock at the new frequency.

In other cases, PLL 304 may remain active, although the pll_clk signal may be inhibited from being provided as the clk signal to HSSI 208 (by mux 308, other gating circuitry, or both). This may allow PLL 304 to begin locking to the new frequency without delay one PLL state machine 310 has provided information to select the new frequency.

In general, the gating of the pll_clk may be accomplished in any suitable manner as to prevent spurious activity on the clk signal path in order to prevent erroneous operation in HSSI 208.

Figure 3:
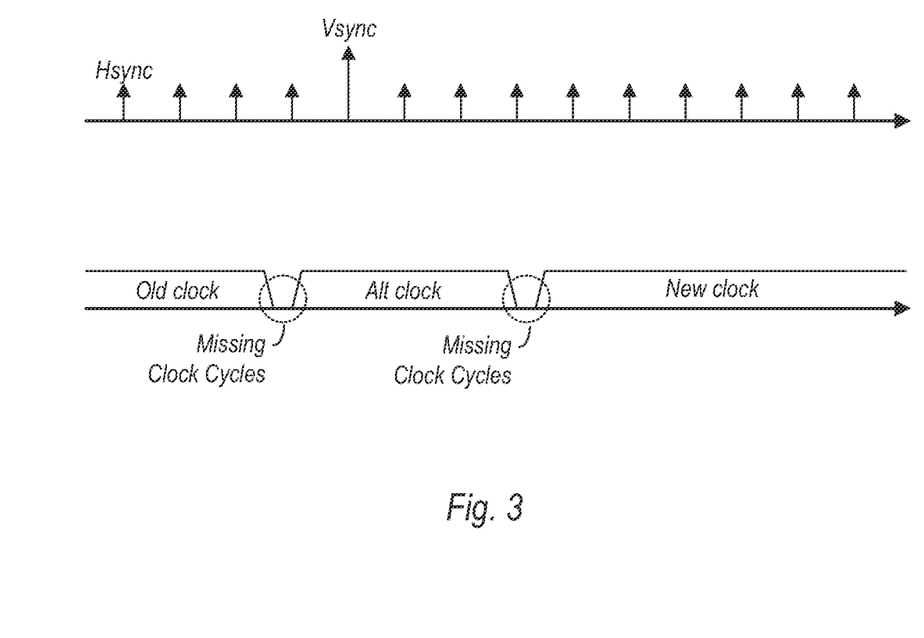
FIG. 3 is an exemplary timing diagram according to one embodiment.
Figure 4:
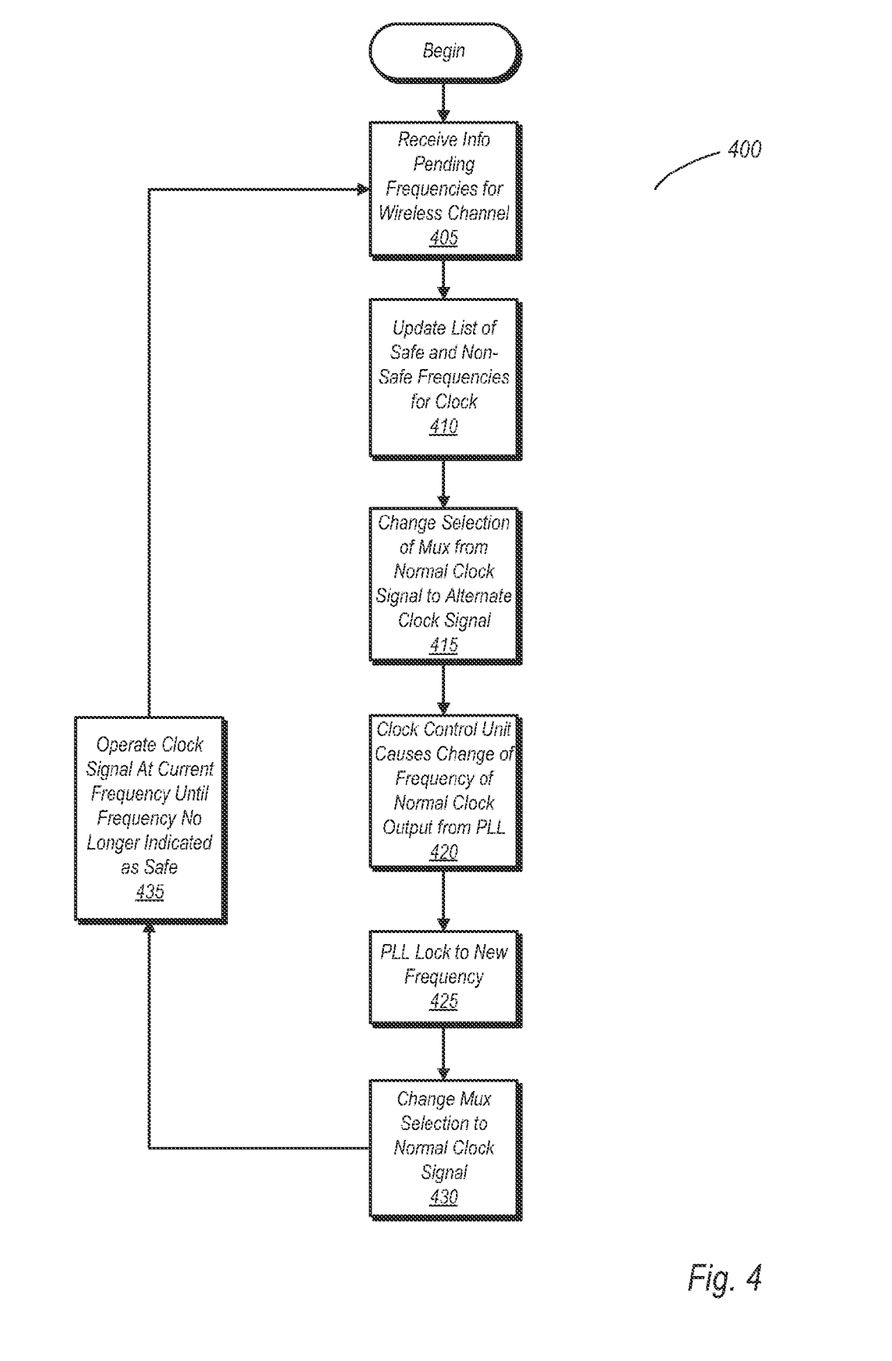
FIG. 4 is a flow diagram illustrating one embodiment of a method for dynamically changing a frequency of a clock signal for an interface based on frequency changes in another interface.

FIG. 3 is a timing diagram illustrating the changes, for one embodiment. As can be seen, PLL state machine 310 may change the old clock frequency of the PLL 304 to the dsi_clock (256.5 MHz in this example) responsive to an indication that the old clock frequency is no longer safe (or is expected to not be safe based on a list of victim frequencies). Changing the clock frequency to the dsi_clock (by changing the selected input of clock mux 308) may include 3-4 missing clock cycles between the changes. The dsi_clock signal may be provided as an alternate clock signal for a predetermined time period within which PLL 304 may lock to a new frequency that is considered to be safe. In the illustrated example, a VSYNC provided to display 240 may coincide with the hardware being in the intermediate state (e.g., when the pll_clk is not being provided as the clk signal). After the PLL 304 has locked to the new frequency, the switch from the dsi_clk to the PLL 304 may occur, with 3-4 missing clock cycles during the change of the selected input of clock mux 308. Changing the frequency of the clock signal in this manner may occur without spurious activity that may cause the display 240 to display information in an erroneous fashion FIG. 4 is a flow diagram of one embodiment of a method for dynamically changing a frequency of a clock signal responsive to frequency changes in a wireless channel/interface. The frequency changes to the clock signal may be performed in order to reduce or eliminated interference with signals received by or transmitted from the wireless interface.

In the embodiment shown, method 400 begins with receiving information regarding frequencies to be used by the wireless channel (block 405). In one embodiment, the frequencies may be those of an RF carrier signal that is subject to periodic changes in accordance with FHSS operation. The list may be generated by baseband firmware operating on a baseband unit and forwarded to a baseband driver, in accordance with the embodiment of FIG. 2. Alternatively, other hardware, software, or firmware may be used to generate such a list.

The providing of the list may result in an updating of a list of frequencies that are safe and non-safe for clock signal operation (block 410). The non-safe frequencies may be those frequencies at which clock signal operation may cause interference with signals conveyed on the wireless channel. More-over, the non-safe frequencies may be those wherein the base frequency or harmonics of the clock signal may potentially interfere with signals conveyed on the wireless channel. In contrast, the safe frequencies may be those where interference is not expected. In some embodiments, the list may be confined to either safe frequencies or non-safe frequencies.

Responsive to an update of the list of safe and/or non-safe clock frequencies, a decision may be made to change the frequency of the clock signal. In particular, such a change may be made if one of the upcoming frequencies of operation of the wireless corresponds to a current operating frequency of the clock signal, or to one of its associated harmonics. If the decision to change the frequency of the clock signal is made, a clock control unit may change the selection of a multiplexer from the output of a clock generator (e.g., a PLL) configured to provide the clock to select an alternate clock signal (block 415). The alternate clock signal may have a fixed frequency, and may only be used during a predetermined period between discontinuing operation at the old clock frequency and resuming operation at the new clock frequency.

Subsequent to changing the selection of the multiplexer from the normal clock signal to the alternate clock signal, the clock control unit may initiate a change of frequency to the normal clock signal output by the PLL (block 420). In one embodiment, the clock control unit may change the divisor of a divider in a PLL in order to cause the change of frequency. After the clock control unit has changed the divisor, the PLL may eventually lock to a new frequency (block 425). The resumption of operation using the normal clock signal at the new frequency may then occur when the clock control unit causes the multiplexer to select the output of the PLL (block 430). Operation of the clock at the new frequency may continue until that frequency is no longer indicated as being a safe frequency.

It is noted that the various method and apparatus embodiments for dynamically changing a clock frequency in response to changing frequencies of signals transmitted on other interfaces are possible and contemplated. For example, in one embodiment, the clock signal may be changed responsive to any pending change to the RF carrier of a wireless interface. Furthermore, the method handling clock generation circuitry during the changeover from may vary from one embodiment to the next. For example, in one embodiment, the output of a PLL may be gated although the PLL may continue operating. In another embodiment, the PLL may be briefly shut down before being powered on again to lock at the new frequency. Furthermore, while some embodiments may provide an alternate clock signal to a serial interface during the changeover, other embodiments are possible and contemplated wherein no clock signal is provided during the changeover, resulting in brief suspension of operation.

Figure 5:
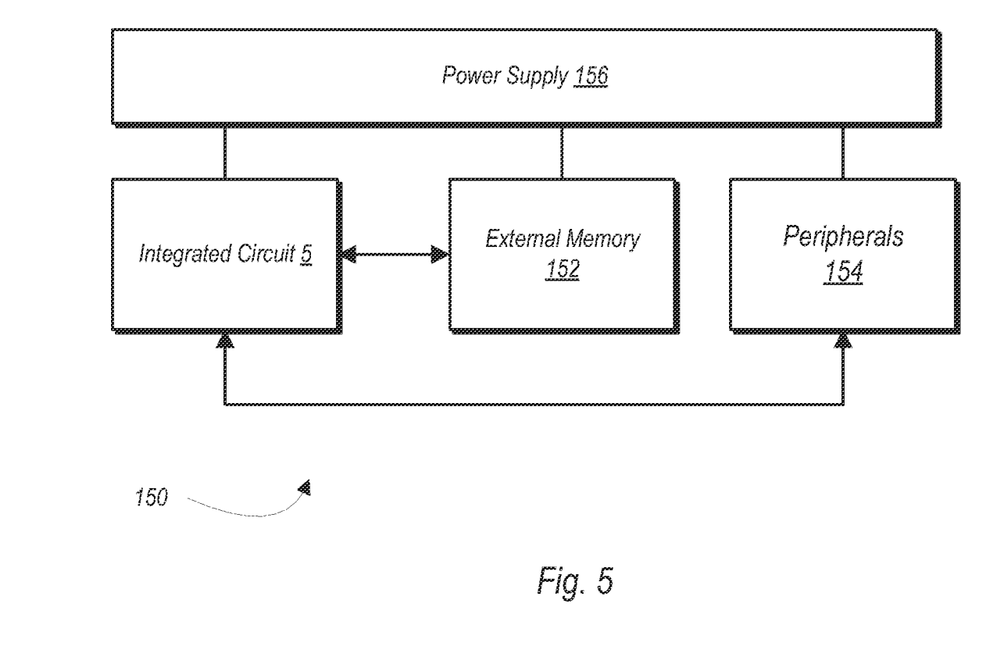
FIG. 5 is a block diagram of one embodiment of an exemplary system.

Turning next to FIG. 5, a block diagram of one embodiment of a system 150 is shown. In the illustrated embodiment, the system 150 includes at least one instance of the IC 5 coupled to external memory 152. IC 5 in the embodiment shown may be an IC that includes those features such as SOC 200 shown in FIG. 1. IC 5 is also coupled to one or more peripherals 154. A power supply 156 is also provided which supplies the supply voltages to the IC 5 as well as one or more supply voltages to the memory 152 and/or the peripherals 154. In some embodiments, more than one instance of the IC 5 may be included (and more than one external memory 152 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
providing a first clock signal for a first interface; and
changing a frequency of the first clock signal from a first frequency to a second frequency responsive to determining that signals are to be conveyed on a second interface at a third frequency;
wherein changing the frequency of the first clock signal comprises placing a signal path for the first clock signal at an intermediate state during the transition from the first frequency to the second frequency.

2. The method as recited in claim 1, wherein changing the frequency of the first clock signal comprises shutting down a phase locked loop (PLL) when in the intermediate state, wherein the PLL is configured to generate the first clock signal.

3. The method as recited in claim 1, wherein changing the frequency of the clock signal comprises inhibiting an output of a phase locked loop (PLL) when in the intermediate state, wherein the PLL is configured to generate the first clock signal.

4. The method as recited in claim 3, wherein inhibiting the output of the PLL comprises a multiplexer selecting a second clock signal having a fourth frequency to be conveyed on the signal path, and wherein changing to the second frequency comprises the multiplexer selecting the output of the PLL subsequent to selecting the second clock signal.

5. The method as recited in claim 4, further comprising selecting the second clock signal at the fourth frequency to avoid interference by the second clock signal and harmonics thereof with the signal conveyed on the second interface.

6. An apparatus comprising:
a first interface, wherein the first interface is coupled to receive a first clock signal from clock generation circuitry, wherein data transmissions on the first interface are synchronized to the first clock signal;
clock control circuitry coupled to the clock generation circuitry, wherein the clock control circuitry is configured to change a frequency the first clock signal from a first frequency to a second frequency responsive to receiving an indication that signals are being conveyed on a second interface at a third frequency, wherein the clock control circuitry is configured to inhibit the first clock signal from being provided on a clock signal path to the first interface when changing the frequency of the first clock signal.

7. The apparatus as recited in claim 6, wherein the clock control circuit is configured to cause a multiplexer to select a second clock signal to be provided on the signal path during a changeover period in which the first clock signal is transitioned from the first frequency to the second frequency.

8. The apparatus as recited in claim 7, wherein the clock control circuit is configured to cause the multiplexer to select the first clock signal subsequent to transitioning the first clock signal to the second frequency.

9. The apparatus as recited in claim 6, wherein the clock control circuit is configured to shut down a phase locked loop (PLL) for a predetermined time during transitioning from the first frequency to the second frequency, wherein the PLL is configured to generate the first clock signal.

10. The apparatus as recited in claim 6, further comprising a first interface unit associated with the first interface and a second interface unit associated with the second interface, wherein the second interface unit is configured to provide information to the first interface unit indicating frequencies at which the first clock signal is operable without causing interference with the signals conveyed on the second interface.

11. A method comprising:
providing a clock signal for a serial interface;
changing a frequency of signals conveyed on a radio interface;
responsive to changing the frequency of signals conveyed on the radio interface, changing the frequency of the clock signal for the serial interface, wherein changing the frequency of the clock signal includes:
discontinuing operation of the clock signal at a current frequency;
waiting for a predetermined time period; and
resuming operation of the clock signal at a new frequency after the predetermined time period has elapsed.

12. The method as recited in claim 11, further comprising providing an alternate clock signal for the serial interface during the predetermined time period.

13. The method as recited in claim 11, further comprising gating the clock signal during the predetermined time period.

14. The method as recited in claim 11, further comprising suspending operation of a phase-locked loop (PLL) during the predetermined time period, wherein the PLL is configured to generate the clock signal.

15. The method as recited in claim 11, further comprising setting the frequency of the clock signal based on the frequency of signals conveyed on the radio interface.

16. A system comprising:
a phase locked loop (PLL) configured to generate a clock signal;
a serial interface, wherein information transmitted on the serial interface is synchronized to the clock signal;
a radio interface configured to convey information on a carrier signal, wherein a frequency of the carrier signal periodically changes;
a control unit configured to cause a change of the frequency of the clock signal from a current frequency to a new frequency responsive to a change of the frequency of the carrier signal, wherein changing the frequency of the clock signal includes isolating the a phase locked loop (PLL) from the serial interface for a predetermined time period.

17. The system as recited in claim 16, wherein responsive to a change of frequency of the carrier signal, the control unit is configured to:
inhibit the clock signal from being provided to the serial interface;
resume providing the clock signal to the serial interface at a predetermined time period subsequent to inhibiting the clock signal.

18. The system as recited in claim 16, further comprising a multiplexer coupled to receive the clock signal from the PLL, and further coupled to receive an alternate clock signal, wherein the control unit is configured to cause the multiplexer to select the alternate clock signal during the predetermined time period.

19. The system as recited in claim 16, wherein the PLL includes a divider, wherein the control unit is configured to change a divisor of the divider responsive to a change of the frequency of the carrier signal.

20. The system as recited in claim 16, further comprising:
a baseband unit, wherein the baseband unit is configured to determine a next frequency of the carrier signal;
a processing unit configured to configured to convey the request to change the frequency of the clock signal to the control unit responsive to the baseband unit providing an indication of a next frequency of the carrier signal.

21. A system comprising:
a serial display interface, wherein data transmission on the serial display interface is synchronized to a clock signal;
a wireless communications interface configured to convey information on a carrier signal over a wireless communications channel, wherein the wireless communications interface is configured to periodically change a frequency of the carrier signal;
a clock generation circuit configured to generate the clock signal; and
a clock controller configured to cause a change of a frequency of the clock signal responsive to a change of the frequency of the carrier signal by the wireless communications interface.

22. The system as recited in claim 21, wherein the wireless interface is configured to convey information including indications of one or more frequencies to which the frequency of the carrier signal is to be changed.

23. The system as recited in claim 22, further comprising processing circuitry configured to maintain a list of frequencies and further configured to update the list of frequencies responsive to the wireless responsive to the wireless interface providing information indicating a new frequency to which the carrier signal is to be changed.

24. The system as recited in claim 23, wherein the processing circuitry is configured to convey a request to the clock controller to change the frequency of the clock signal responsive to receiving information indicating a new frequency to which the carrier signal is to be changed.

25. The system as recited in claim 24, wherein the clock controller is configured to change the frequency of the clock signal to a frequency to avoid interference with the carrier signal by the clock signal and corresponding harmonics of the clock signal.

* * * * *